(12) United States Patent
Chang

(10) Patent No.: US 9,426,493 B2
(45) Date of Patent: Aug. 23, 2016

(54) METHOD AND APPARATUS FOR INTER-PICTURE COST COMPUTATION

(71) Applicant: INDUSTRIAL TECHNOLOGY RESEARCH INSTITUTE, Hsinchu (TW)

(72) Inventor: Yao-Jen Chang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 337 days.

(21) Appl. No.: 14/300,266

(22) Filed: Jun. 10, 2014

(65) Prior Publication Data

US 2015/0139322 A1   May 21, 2015

(30) Foreign Application Priority Data

Nov. 19, 2013 (TW) .............................. 102142135 A

(51) Int. Cl.
*H04N 19/51* (2014.01)
*H04N 19/86* (2014.01)
(Continued)

(52) U.S. Cl.
CPC ............ *H04N 19/86* (2014.11); *H04N 19/117* (2014.11); *H04N 19/137* (2014.11); *H04N 19/172* (2014.11); *H04N 19/82* (2014.11)

(58) Field of Classification Search
CPC .. H04N 19/172; H04N 19/117; H04N 19/86; H04N 19/82; H04N 19/137
USPC ..................................................... 375/240.16
See application file for complete search history.

(56) References Cited

U.S. PATENT DOCUMENTS

2007/0097257 A1   5/2007 El-Maleh et al.
2008/0165848 A1   7/2008 Ye et al.
(Continued)

FOREIGN PATENT DOCUMENTS

TW           201320759 A    5/2013
WO   WO 2013068427 A2 *    5/2013   ............. H04N 19/85
(Continued)

OTHER PUBLICATIONS

Chih-Ming Fu et al., "Sample Adaptive Offset in the HEVC Standard" IEEE Transactions on Circuits and Systems for Video Technology (vol. 22, Issue 12), pp. 1755-1764, Dec. 2012.
(Continued)

*Primary Examiner* — Christopher S Kelley
*Assistant Examiner* — Zhihan Zhou
(74) *Attorney, Agent, or Firm* — Rabin & Berdo, P.C.

(57) ABSTRACT

A method and an apparatus for inter-picture cost computation are provided. The inter-picture cost computation apparatus includes an original difference calculation module, a before-compensation difference calculation module, an inter-picture cost computation module, and a compensation module. The original difference calculation module calculates original differences between first original pixels at the first frame time and second original pixels at the second frame time. The before-compensation difference calculation module calculates before-compensation differences between first compensated pixels at the first frame time and reconstructed pixels at the second frame time. The inter-picture cost calculation module calculates an inter-picture cost according to the sample adaptive offset (SAO) compensation value, the original differences, and the before-compensation differences. The compensation module compensates the reconstructed pixels according to the SAO compensation value when the inter-picture cost is a minimum.

21 Claims, 14 Drawing Sheets

(51) Int. Cl.
*H04N 19/172* (2014.01)
*H04N 19/117* (2014.01)
*H04N 19/137* (2014.01)
*H04N 19/82* (2014.01)

(56) References Cited

U.S. PATENT DOCUMENTS

| | | |
|---|---|---|
| 2012/0008680 A1 | 1/2012 | He et al. |
| 2012/0177103 A1* | 7/2012 | Fu .................. H04N 19/82 375/240.02 |
| 2012/0177107 A1 | 7/2012 | Fu et al. |
| 2012/0287988 A1 | 11/2012 | Chong et al. |
| 2013/0028533 A1 | 1/2013 | Yang et al. |
| 2013/0051454 A1* | 2/2013 | Sze .................. H04N 19/70 375/240.02 |
| 2013/0077697 A1 | 3/2013 | Chen et al. |
| 2013/0114678 A1 | 5/2013 | Baylon et al. |
| 2013/0136167 A1 | 5/2013 | Chong et al. |
| 2013/0177067 A1 | 7/2013 | Minoo et al. |
| 2013/0177068 A1 | 7/2013 | Minoo et al. |
| 2013/0182759 A1 | 7/2013 | Kim et al. |
| 2014/0192860 A1* | 7/2014 | Onno ............... H04N 19/30 375/240.02 |
| 2014/0294068 A1* | 10/2014 | Andersson ....... H04N 19/00127 375/240.02 |
| 2014/0301480 A1* | 10/2014 | Francois ........... H04N 19/85 375/240.25 |
| 2014/0301489 A1* | 10/2014 | Laroche ........... H04N 19/85 375/240.29 |
| 2014/0369429 A1* | 12/2014 | Laroche ........... H04N 19/85 375/240.29 |

FOREIGN PATENT DOCUMENTS

| | | | | |
|---|---|---|---|---|
| WO | WO 2013068428 A2 * | 5/2013 | ............. | H04N 19/85 |
| WO | WO 2013068433 A2 * | 5/2013 | ............. | H04N 19/85 |
| WO | WO 2013070147 A1 * | 5/2013 | ....... | H04N 19/00127 |

OTHER PUBLICATIONS

Chih-Ming Fu et al., "Sample Adaptive Offset for HEVC" 2011 IEEE 13th International Workshop on Multimedia Signal Processing (MMSP), pp. 1-5, Oct. 2011.

Young-Joe Yoo et al., "Enhanced Adaptive Loop Filter for Motion Compensated Frame" IEEE Transactions on image processing, vol. 20, No. 8, Aug. 2011.

Kei Kawamura et al., "Asymmetric Partitioning with Non-power-of-two Transform for Intra Coding" 2012 Picture Coding Symposium (PCS), pp. 429-432, May 2012.

Seishi Takamura et al., "Automatic Construction of Nonlinear Denoising Filter for Video Coding" 2012 Picture Coding Symposium(PCS), pp. 433-436, May 2012.

Siwei Ma et al., "A Study on the Rate Distortion Modeling for High Efficiency Video Coding" 2012 19th IEEE International Conference on Image Processing (ICIP), pp. 181-184, Sep. 2012.

Chih-Ming Fu et al, "Sample Adaptive Offset in the HEVC Standard", IEEE Transactions on Circuits and Systems for Video Technology, vol. 22, No. 12, Dec. 2012.

Taiwanese Office Action dated Oct. 16, 2014.

* cited by examiner

Original pixels

METHOD AND APPARATUS FOR INTER-PICTURE COST COMPUTATION

This application claims the benefit of Taiwan application Serial No. 102142135, filed on Nov. 19, 2013, the disclosure of which is incorporated by reference herein in its entirety.

TECHNICAL FIELD

The disclosure relates to an inter-picture cost computation method and an inter-picture cost computation apparatus.

BACKGROUND

There are at least five grouping methods for sample adaptive offset (SAO) compensation in high efficiency video coding (HEVC) standard. The five grouping method are band offset (BO), edge offset 1 (EO1), edge offset 2 (EO2), edge offset 3 (EO3), and edge offset 4 (EO4). Referring to FIG. 1, FIG. 1 is a diagram of band offset grouping method. The unit for SAO compensation is a block. The block size specified in the standard may be 64×64, 32×32, 16×16, etc. There are two steps specified in SAO compensation process. At first, the pixels of the reconstructed picture in the block are divided into groups. The reconstructed pixels with pixel values 0~7 are grouped as group 1, the reconstructed pixels with pixel values 8~15 as group 2, etc. The reconstructed pixels can be divided into 32 groups. Then, SAO compensation for the reconstructed pixels in each group is performed respectively. The group 1 to group 32 are corresponding to SAO compensation value $a_1$ to $a_{32}$ respectively.

Referring to both FIG. 2 and FIG. 3, FIG. 2 is a diagram of an original picture. FIG. 3 is a diagram of generating a compensated picture according to a reconstructed picture and SAO compensation values. To be simplified for description, a 3×3 block is used as an example in FIG. 2. The compensated picture is obtained by adding the reconstructed pixels of the reconstructed picture with SAO compensation values respectively. The SAO compensation value corresponding to group 1 is +2, and the SAO compensation value corresponding to group 2 is −1. The compensated pixels shown in FIG. 3 are consistent with the original pixels shown in FIG. 2 basically.

Referring to FIG. 4, FIG. 5, FIG. 6, and FIG. 7. FIG. 4 is a diagram of edge offset 1 grouping method. FIG. 5 is a diagram of edge offset 2 grouping method. FIG. 6 is a diagram of edge offset 3 grouping method. FIG. 7 is a diagram of edge offset 4 grouping method. The directional patterns for edge offset 1, edge offset 2, edge offset 3, and edge offset 4 are horizontal, vertical, 135 degree diagonal, and 45 degree diagonal respectively. The group 1 to group 4 are corresponding to SAO compensation value $a_1$ to $a_4$ respectively. For example, as shown in FIG. 4, when the pixel value of a reconstructed pixel a and the pixel value of a reconstructed pixel b are larger than the pixel value of a reconstructed pixel c, the reconstructed pixel c is classified as group 1. The reconstructed pixels in group 1 are corresponding to SAO compensation value $a_1$. When the pixel value of the reconstructed pixel a and the pixel value of the reconstructed pixel c are the same, and the pixel value of the reconstructed pixel a and the pixel value of the reconstructed pixel c are smaller than the pixel value of the reconstructed pixel b, the reconstructed pixel c is classified as group 2. Or, when the pixel value of the reconstructed pixel b and the pixel value of the reconstructed pixel c are the same, and the pixel value of the reconstructed pixel b and the pixel value of the reconstructed pixel c are smaller than the pixel value of the reconstructed pixel a, the reconstructed pixel c is classified as group 2. The reconstructed pixels in group 2 are corresponding to SAO compensation value $a_2$.

When the pixel value of the reconstructed pixel a and the pixel value of the reconstructed pixel c are the same, and the pixel value of the reconstructed pixel a and the pixel value of the reconstructed pixel c are larger than the pixel value of the reconstructed pixel b, the reconstructed pixel c is classified as group 3. Or, when the pixel value of the reconstructed pixel b and the pixel value of the reconstructed pixel c are the same and the pixel value of the reconstructed pixel b and the pixel value of the reconstructed pixel c are larger than the pixel value of the reconstructed pixel a, the reconstructed pixel c is classified as group 3. The reconstructed pixels in group 3 are corresponding to SAO compensation value $a_3$. When the pixel value of the reconstructed pixel a and the pixel value of the reconstructed pixel b are smaller than the pixel value of the reconstructed pixel c, the reconstructed pixel c is classified as group 4. The reconstructed pixels in group 4 are corresponding to SAO compensation value $a_4$. The reconstructed pixels in group 1, in group 2, in group 3, and in group 4 are SAO compensated according to the corresponding SAO compensation value $a_1$, SAO compensation value $a_2$, SAO compensation value $a_3$, SAO compensation value $a_4$ respectively.

SUMMARY

The disclosure relates to an inter-picture cost computation method and an inter-picture cost computation apparatus.

According to one embodiment of the disclosure, an inter-picture cost computation method is provided. The inter-picture cost computation method includes calculating original differences between first original pixels at the first frame time and second original pixels at the second frame time; calculating a before-compensation differences between first compensated pixels at the first frame time and reconstructed pixels at the second frame time; calculating an inter-picture cost according to the sample adaptive offset (SAO) compensation value, the original differences, and the before-compensation differences; compensating the reconstructed pixels according to the SAO compensation value when the inter-picture cost is a minimum.

According to one embodiment of the disclosure, an inter-picture cost computation apparatus is provided. The inter-picture cost computation apparatus includes an original difference calculation module, a before-compensation difference calculation module, an inter-picture cost computation module, and a compensation module. The original difference calculation module calculates original differences between first original pixels at the first frame time and second original pixels at the second frame time. The before-compensation difference calculation module calculates before-compensation differences between first compensated pixels at the first frame time and reconstructed pixels at the second frame time. The inter-picture cost calculation module calculates an inter-picture cost according to the sample adaptive offset (SAO) compensation value, the original differences, and the before-compensation differences. The compensation module compensates the reconstructed pixels according to the SAO compensation value when the inter-picture cost is a minimum.

In the following detailed description, for purposes of explanation, numerous specific details and drawings are set forth in order to provide a thorough understanding of the disclosed embodiments.

DETAILED DESCRIPTION

First Embodiment

Figure 1:
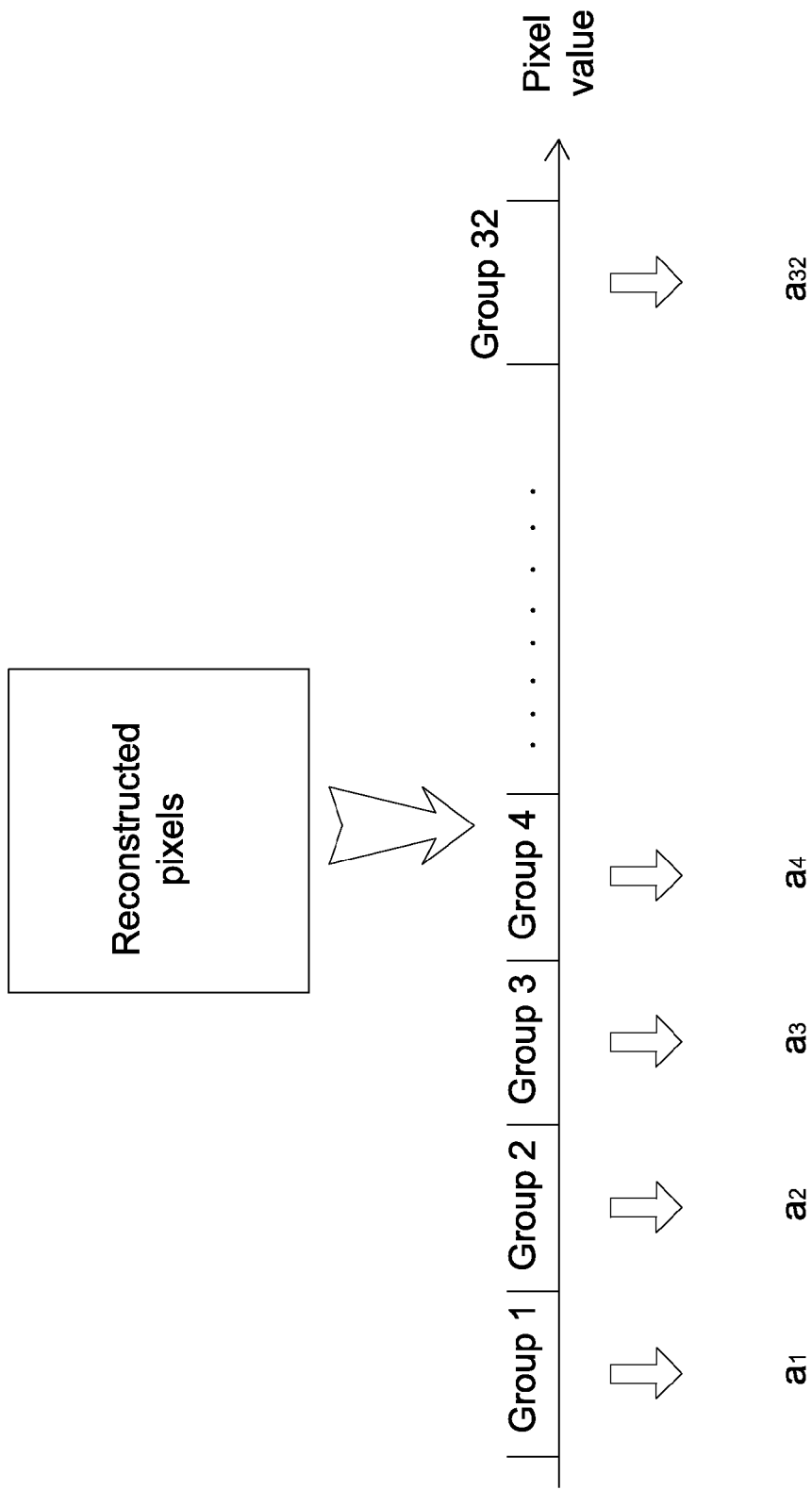
FIG. 1 is a diagram of band offset grouping method.
Figure 2:
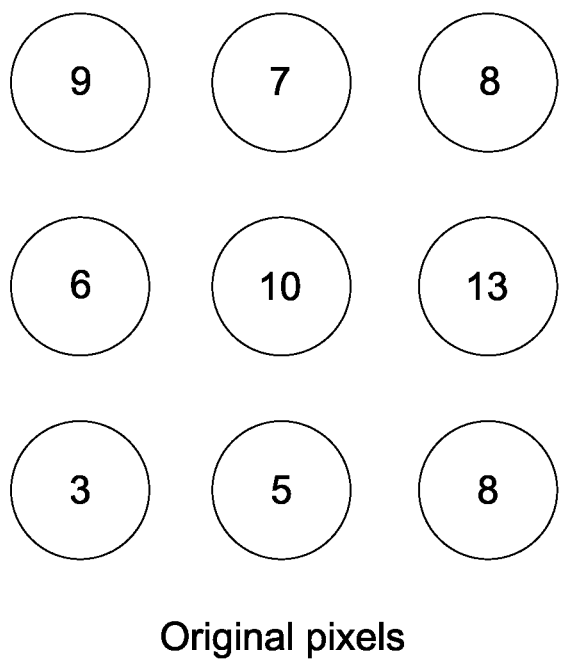
FIG. 2 is a diagram of an original picture.
Figure 3:
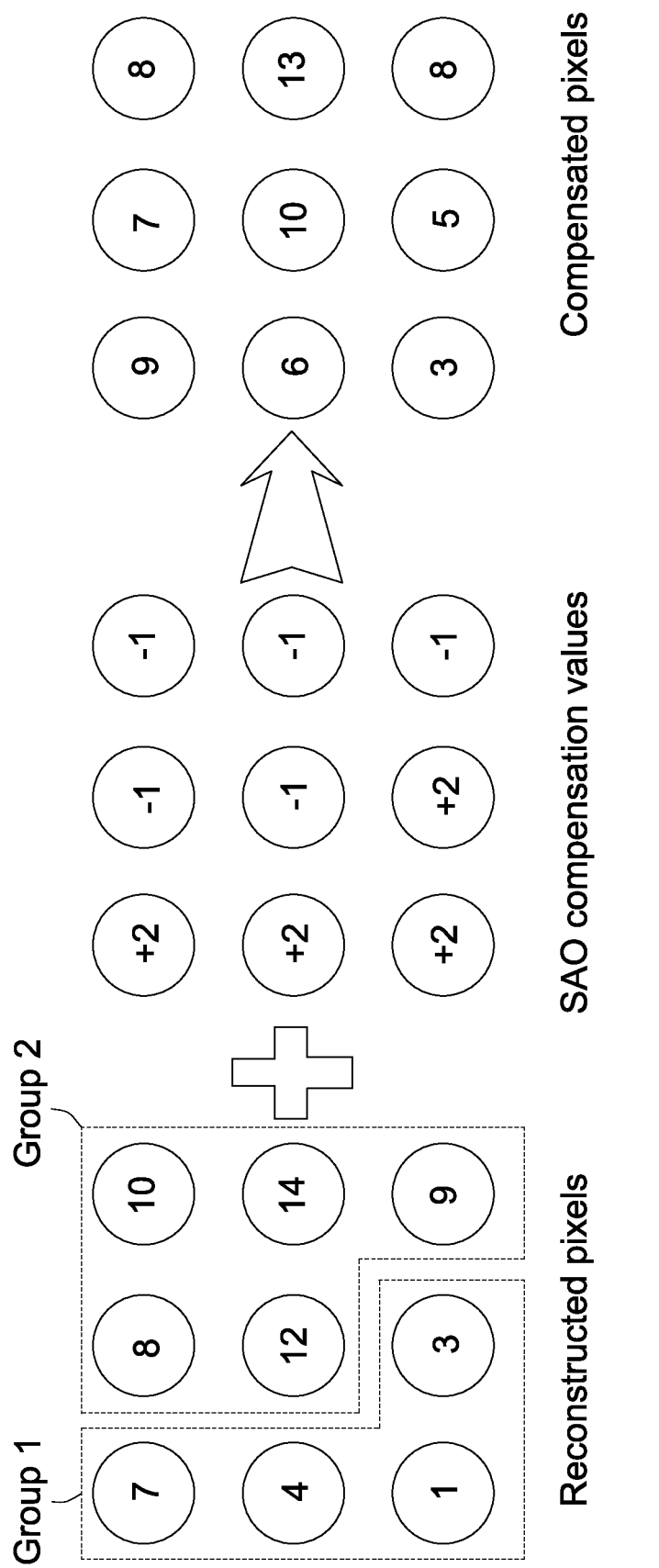
FIG. 3 is a diagram of generating a compensated picture according to a reconstructed picture and SAO compensation values.
Figure 4:
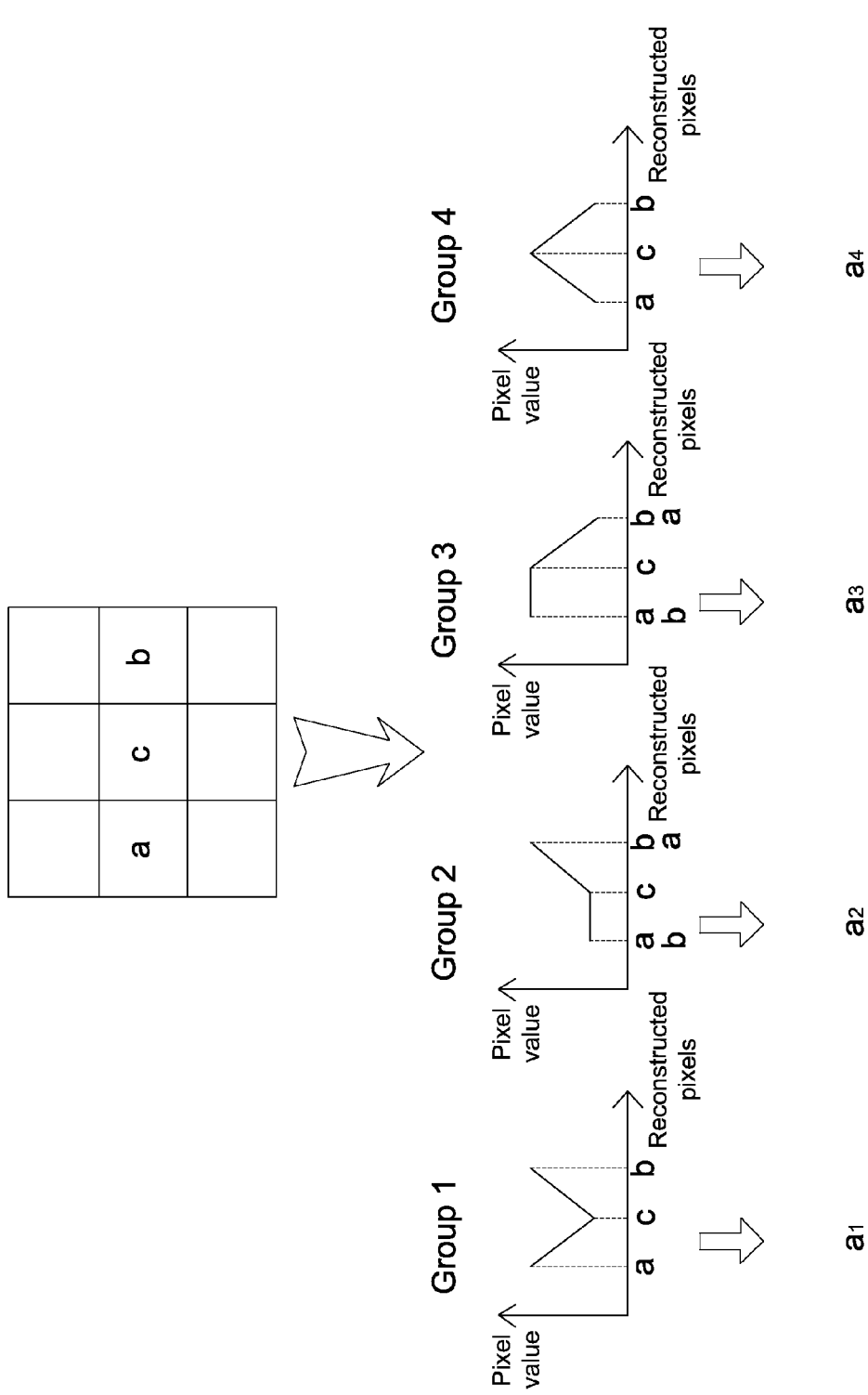
FIG. 4 is a diagram of edge offset 1 grouping method.
Figure 5:
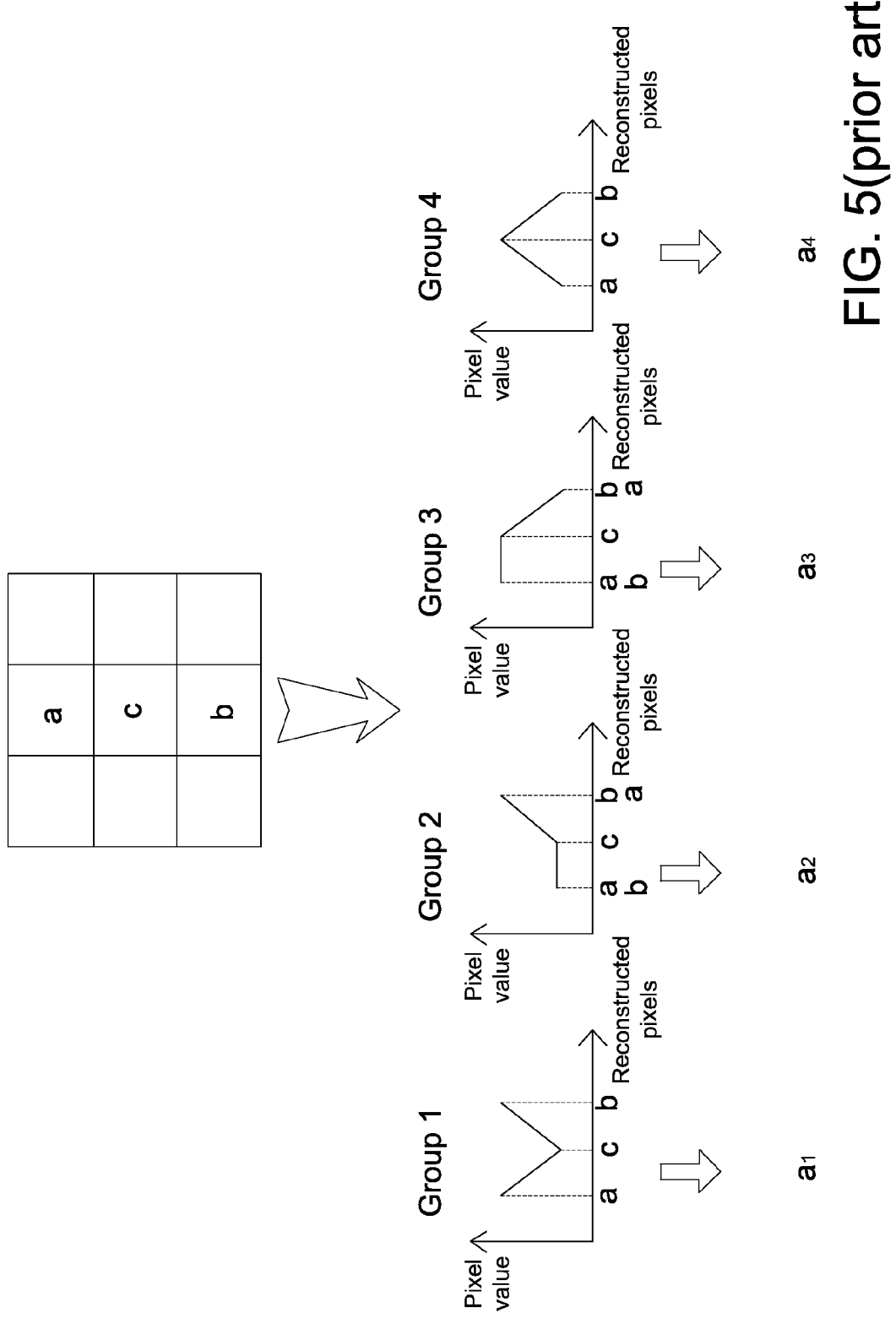
FIG. 5 is a diagram of edge offset 2 grouping method.
Figure 6:
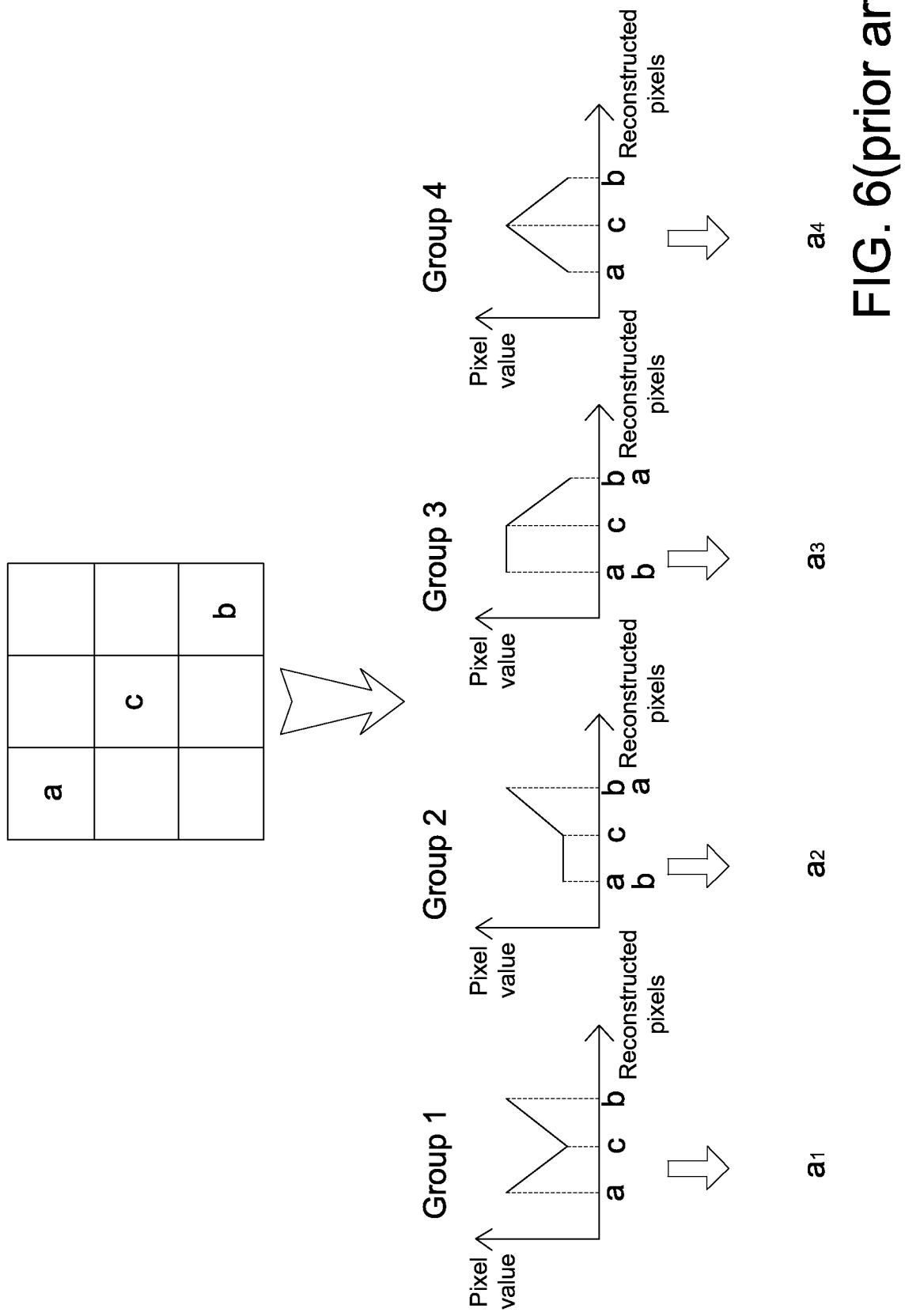
FIG. 6 is a diagram of edge offset 3 grouping method.
Figure 7:
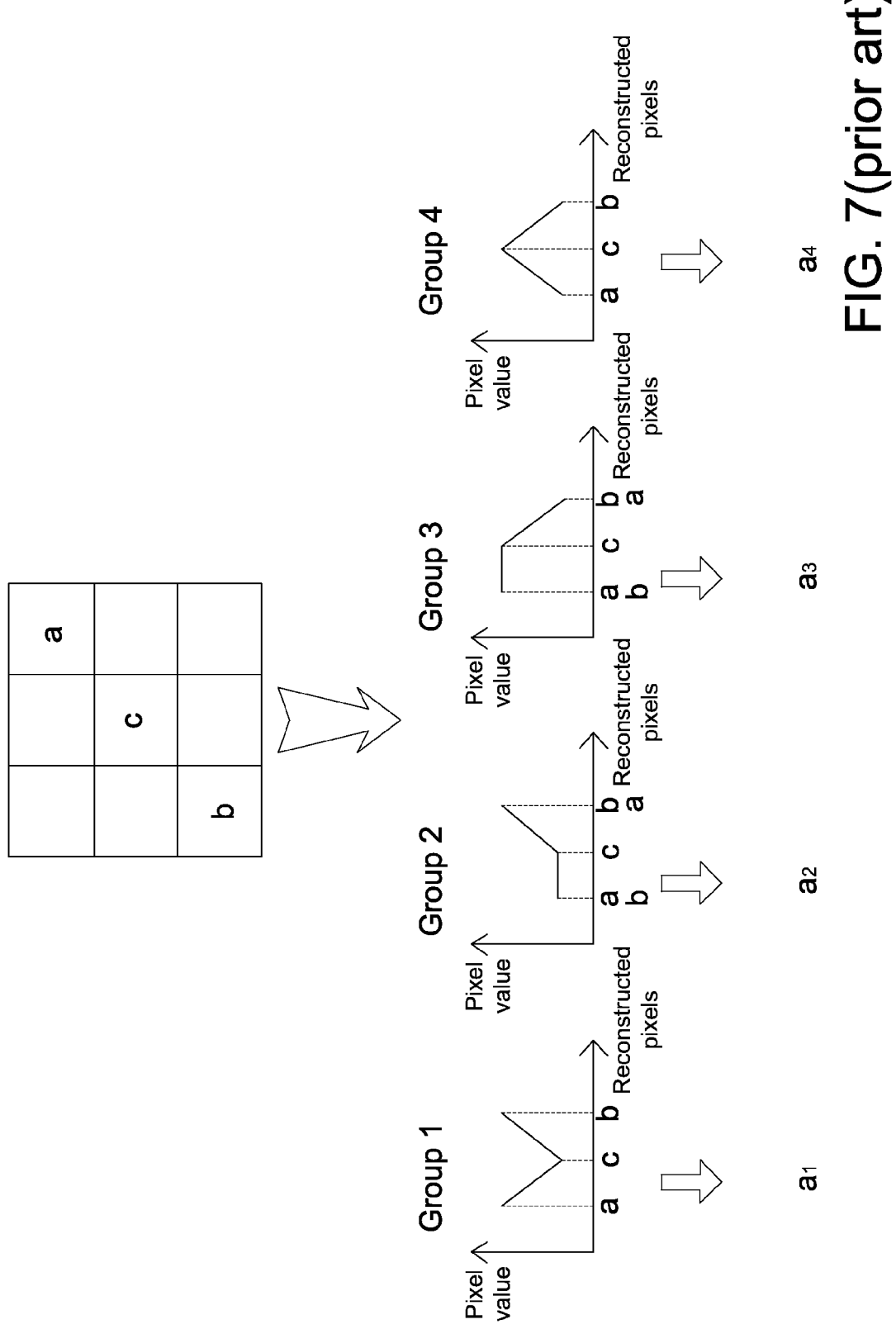
FIG. 7 is a diagram of edge offset 4 grouping method.
Figure 8:
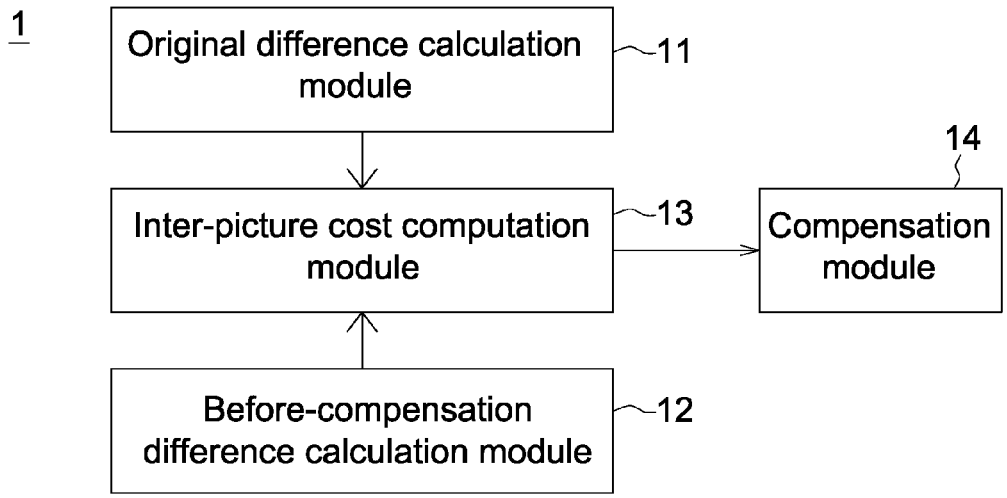
FIG. 8 is a block diagram of an inter-picture cost computation apparatus according to first embodiment.
Figure 9:
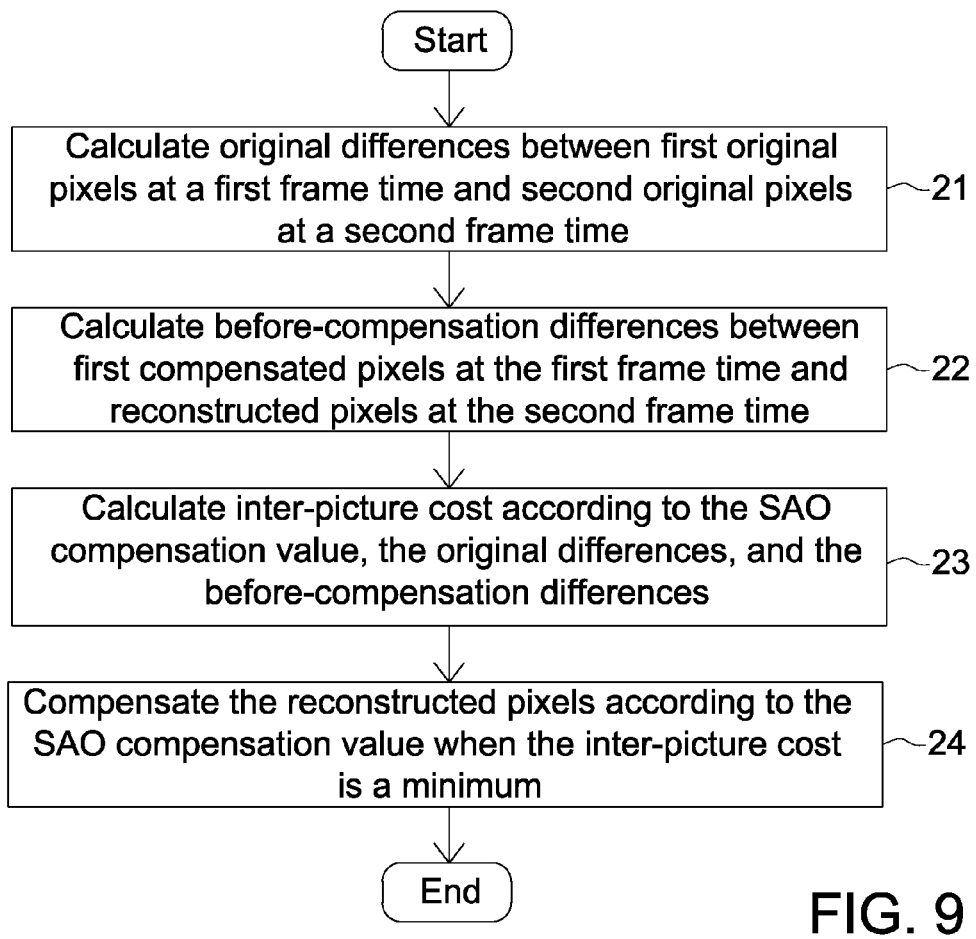
FIG. 9 is a flowchart of an inter-picture cost computation method according to first embodiment.
Figure 10:
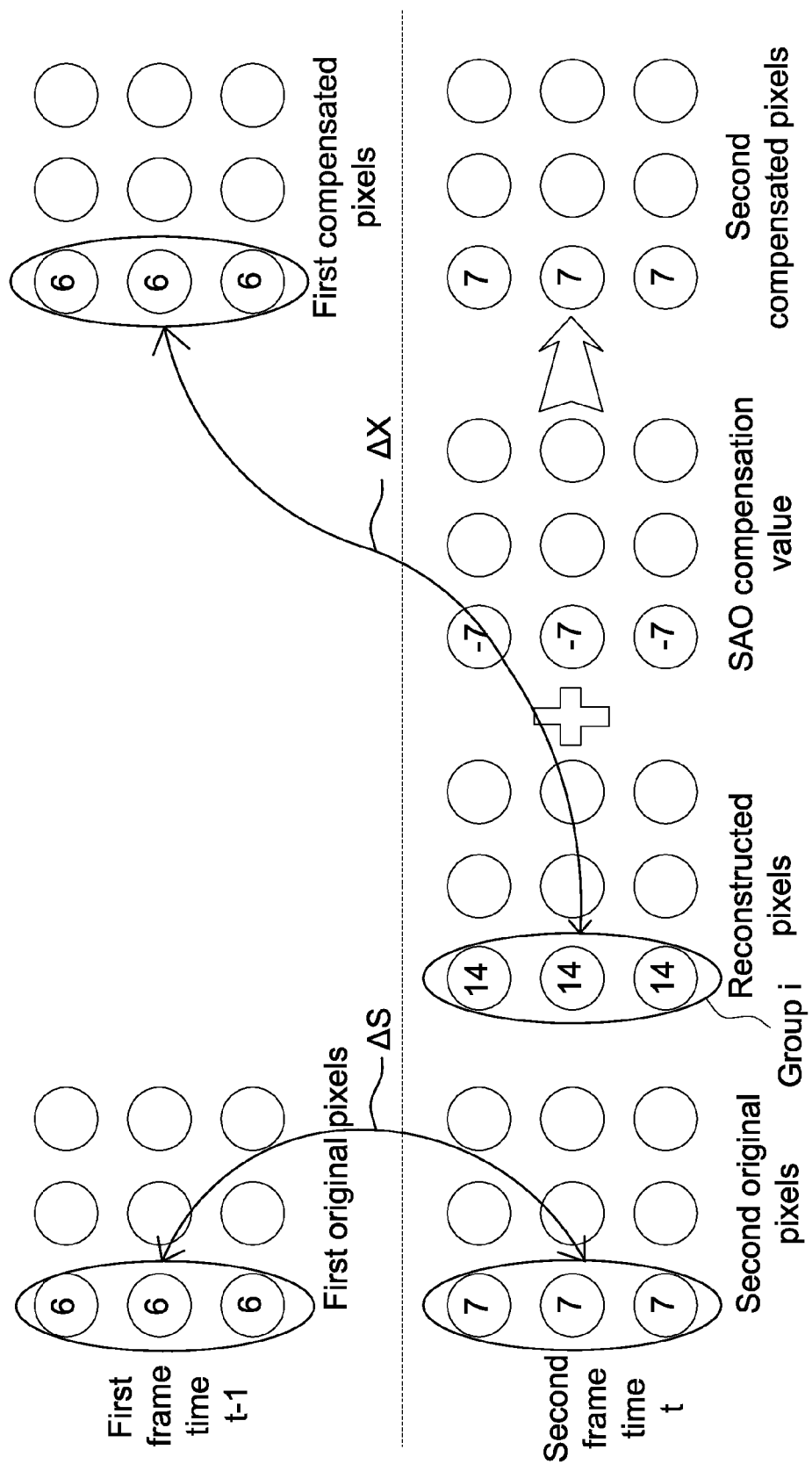
FIG. 10 is a diagram showing original differences and before-compensation differences.

Referring to FIG. 8, FIG. 9, and FIG. 10, FIG. 8 is a block diagram of an inter-picture cost computation apparatus according to first embodiment. FIG. 9 is a flowchart of an inter-picture cost computation method according to first embodiment. FIG. 10 is a diagram showing original differences and before-compensation differences. To be simplified for description, a 3×3 block is used as an example in FIG. 10. Inter-picture cost computation apparatus 1 includes an original difference calculation module 11, a before-compensation difference calculation module 12, an inter-picture cost computation module 13, and a compensation module 14. The original difference calculation module 11, the before-compensation difference calculation module 12, the inter-picture cost computation module 13, and the compensation module 14, for example, may be implemented by executing program by central processing unit (CPU), Digital Signal Processor (DSP), integrated circuit (IC), computer, or mobile devices. In addition, the original difference calculation module 11, the before-compensation difference calculation module 12, the inter-picture cost computation module 13, and the compensation module 14 may also be implemented by hardware or hardware circuits. As shown in step 21, the original difference calculation module 11 calculates original differences ΔS between first original pixels at a first frame time t−1 and second original pixels at a second frame time t. The first original picture which is corresponding to the first frame time t−1 includes a plurality of first original pixels, and second original picture which is corresponding to the second frame time t includes a plurality of second original pixels. The absolute value of the original difference at position k $\Delta S_k$ is $|S_{k,t}-S_{k,t-1}|$. $S_{k,t}$ is a second original pixel at position k in the second original picture at the second frame time t, and k is an integer. $S_{k,t-1}$ is a first original pixel at position k in the first original picture at the first frame time t−1. To be simplified for description, the first original pixels in the first column, the second original pixels in the first column, the reconstructed pixels in the first column, and the first compensated pixels in the first column shown in FIG. 10 are used as an example in the following description. At the first frame time t−1, the pixel values of the first original pixels are 6, 6, and 6. At the second frame time t, the pixel values of the second original pixels are 7, 7, and 7. Therefore, the original differences ΔS are 1, 1, and 1.

As shown in step 22, the before-compensation difference calculation module 12 calculates before-compensation differences ΔX between first compensated pixels at the first frame time t−1 and reconstructed pixels at the second frame time t. In this embodiment, the second original picture is encoded and then decoded, and the generated picture after decoding is a reconstructed picture. And the reconstructed pixels are the pixels in the reconstructed picture. Since there may be some distortion caused during the encoding and compressing process of the second original picture, the reconstructed picture is not the same with the second original picture. A second compensated picture is generated by compensating the reconstructed pixels at the second frame time t with the corresponding SAO compensation value $a_c$. Second compensated pixels are the pixels in the second compensated picture. Similarly, a first compensated picture is generated by compensating the reconstructed pixels at the first frame time t−1 with the corresponding SAO compensation value $a_c$, and the first compensated pixels are the pixels in the first compensated picture.

As shown in FIG. 10, for example, the pixel values of the first compensated pixels at the first frame time t−1 are 6, 6, and 6. The pixel values of the reconstructed pixels at the second frame time t are 14, 14, and 14. Therefore, the before-compensation differences ΔX are 8, 8, and 8. The absolute value of the before-compensation difference at position k $\Delta X_k$ is $|X_{k,t}-X_{k,t-1}^r|$. $X_{k,t}$ is the reconstructed pixel at position k in the reconstructed picture at the second frame time t. $X_{k,t-1}^r$ is the first compensated pixel at position k in the first compensated picture at the first frame time t−1. The reconstructed pixels are corresponding to SAO compensation values. The SAO compensation values may be from −7 to +7. As shown in FIG. 10, for example, the SAO compensation value corresponding to the reconstructed pixels of group i is −7. The grouping method of SAO may be, for example, band offset, edge offset 1, edge offset 2, edge offset 3, or edge offset 4. To be simplified for description, in first embodiment, band offset is used as an example of grouping method. As shown in step 23, inter-picture cost computation module 13 calculates an inter-picture cost according to the SAO compensation value $a_c$, the original differences ΔS, and the before-compensation differences ΔX. As shown in step 24, compensation module 14 compensates the reconstructed pixels according to the SAO compensation value when the inter-picture cost is a minimum.

Figure 11:
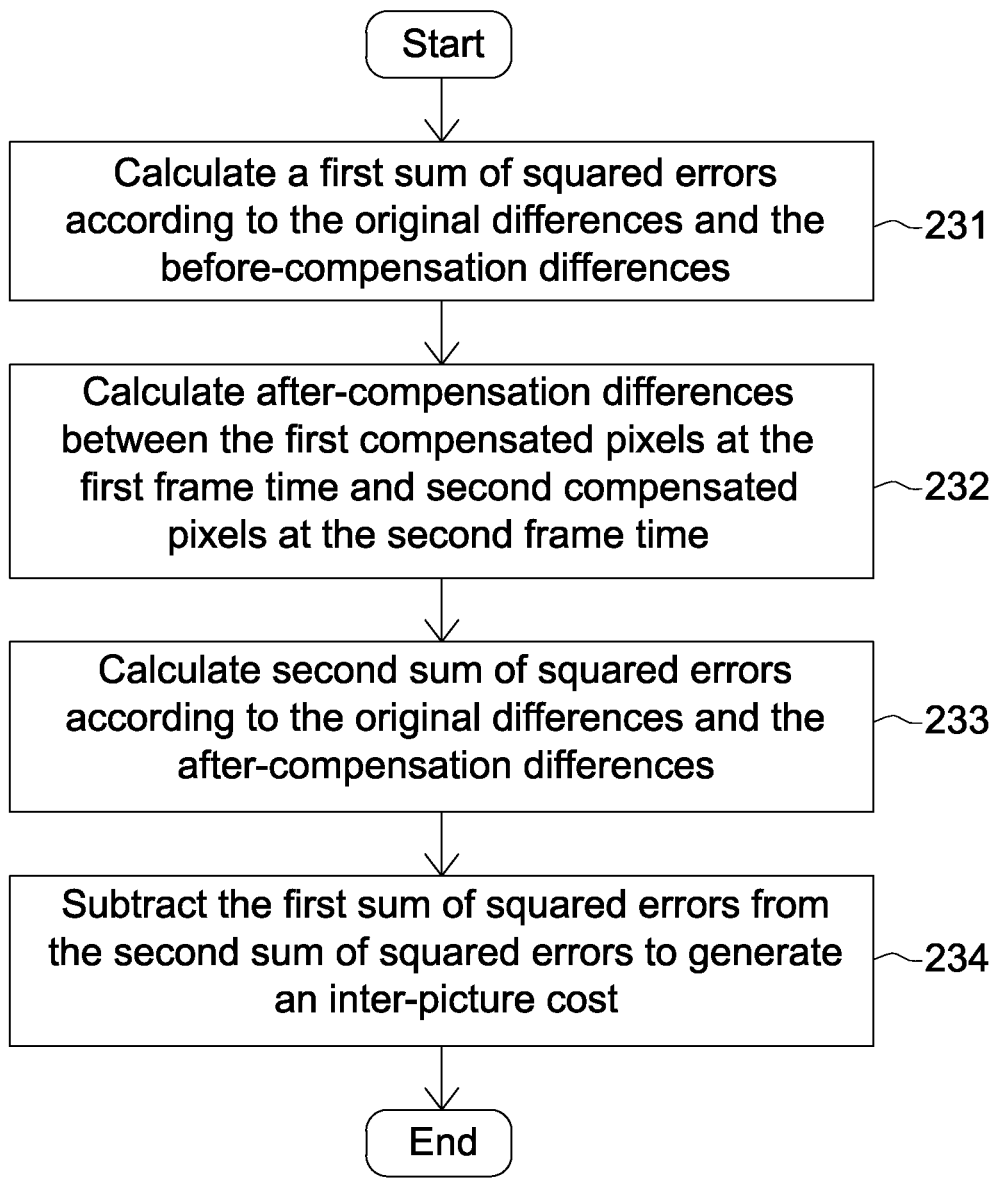
FIG. 11 is a detailed flowchart of step 23 according to first embodiment.
Figure 12:
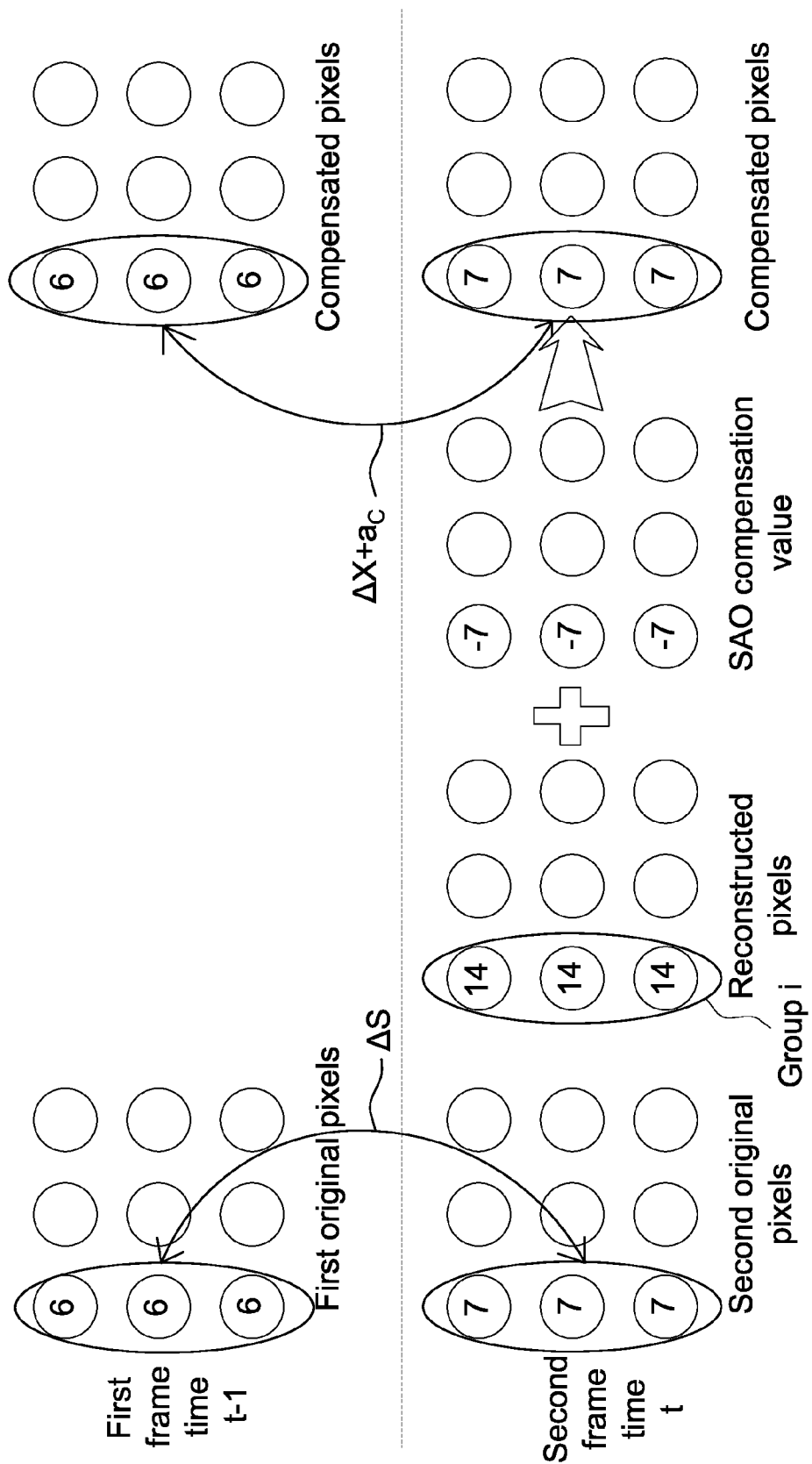
FIG. 12 is a diagram showing differences after compensation.
Figure 13A:
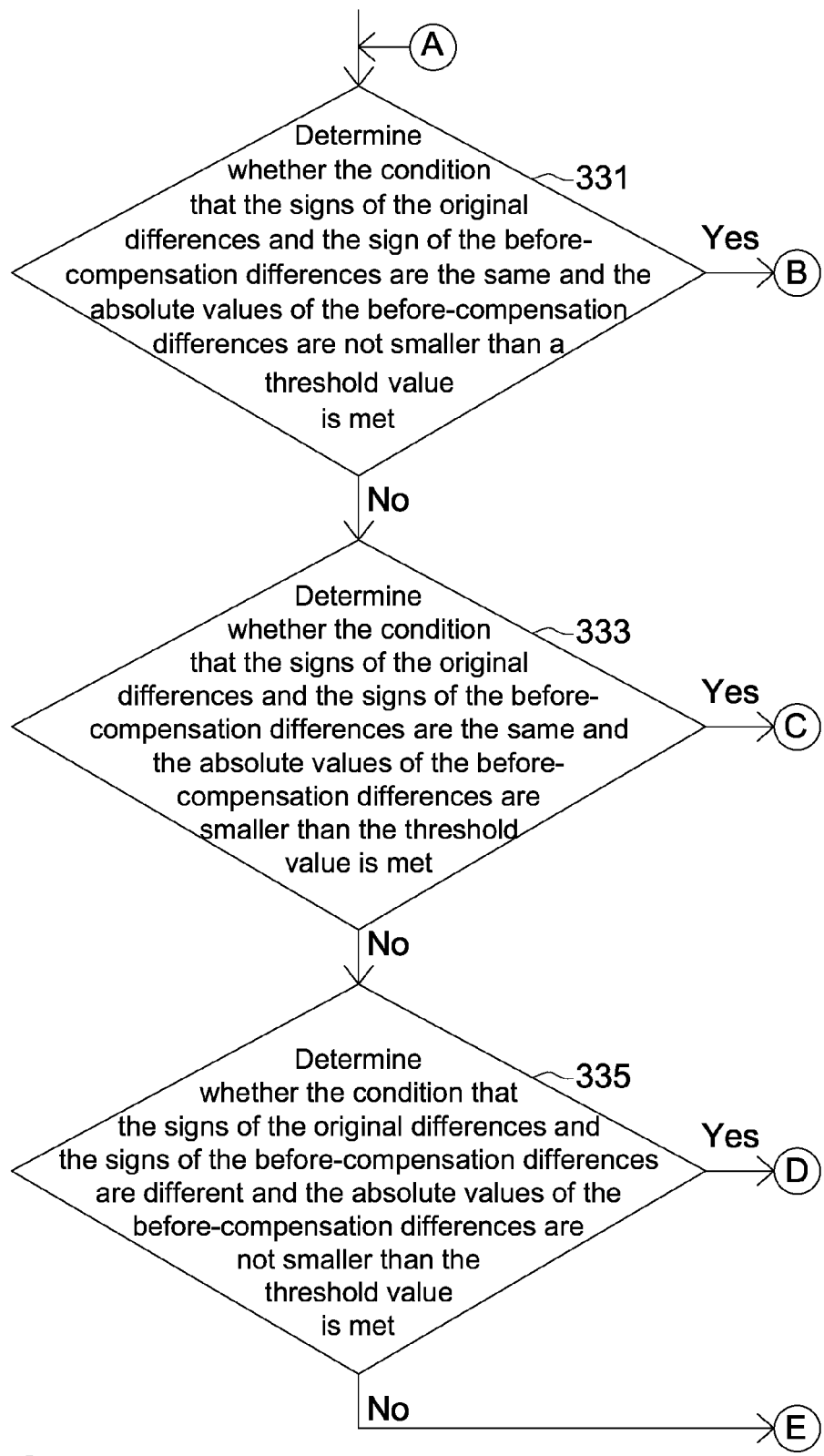
FIG. 13A, FIG. 13B, and FIG. 14 are detailed flowcharts of step 23 according to second embodiment.
Figure 13B:
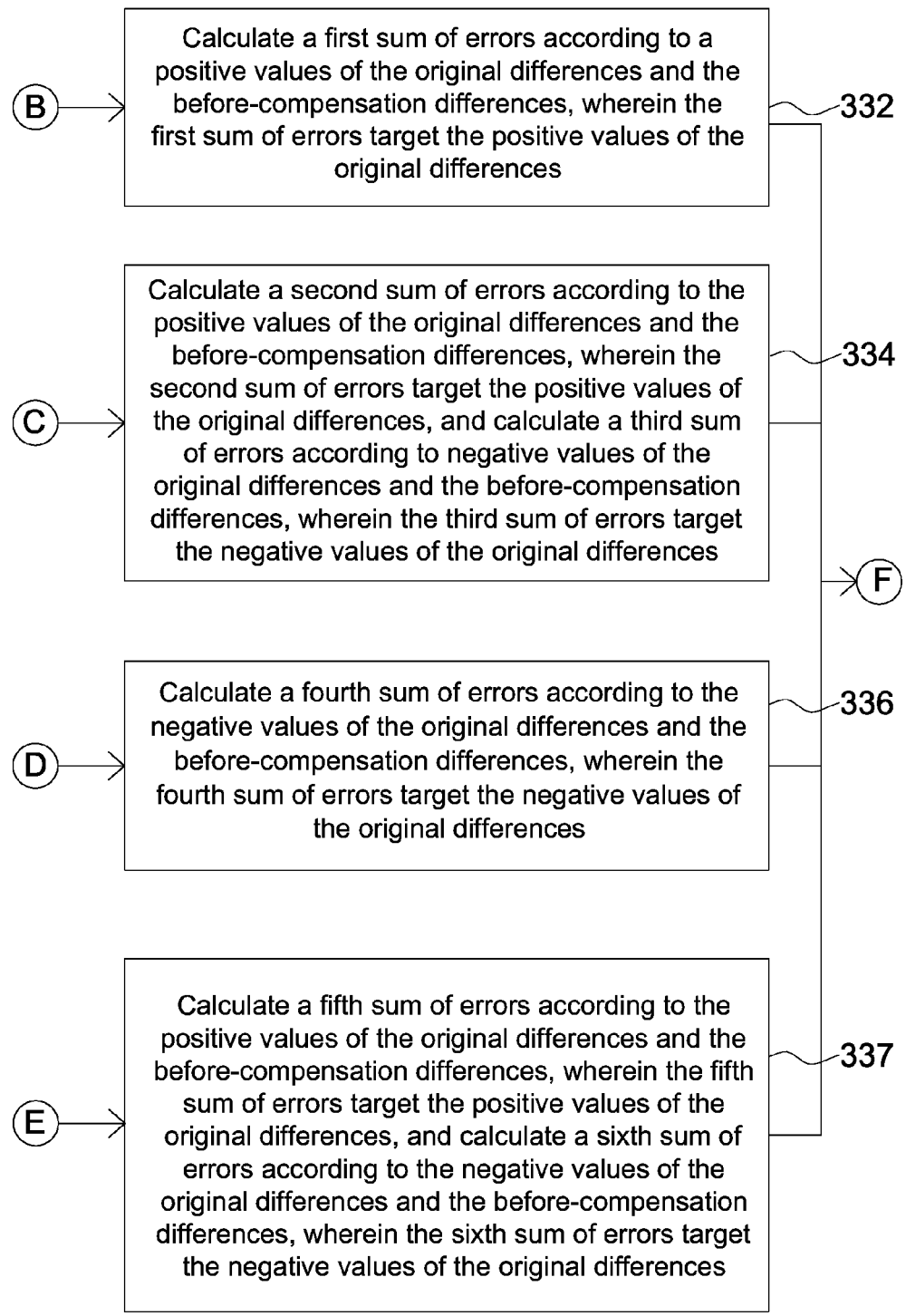
Figure 14:
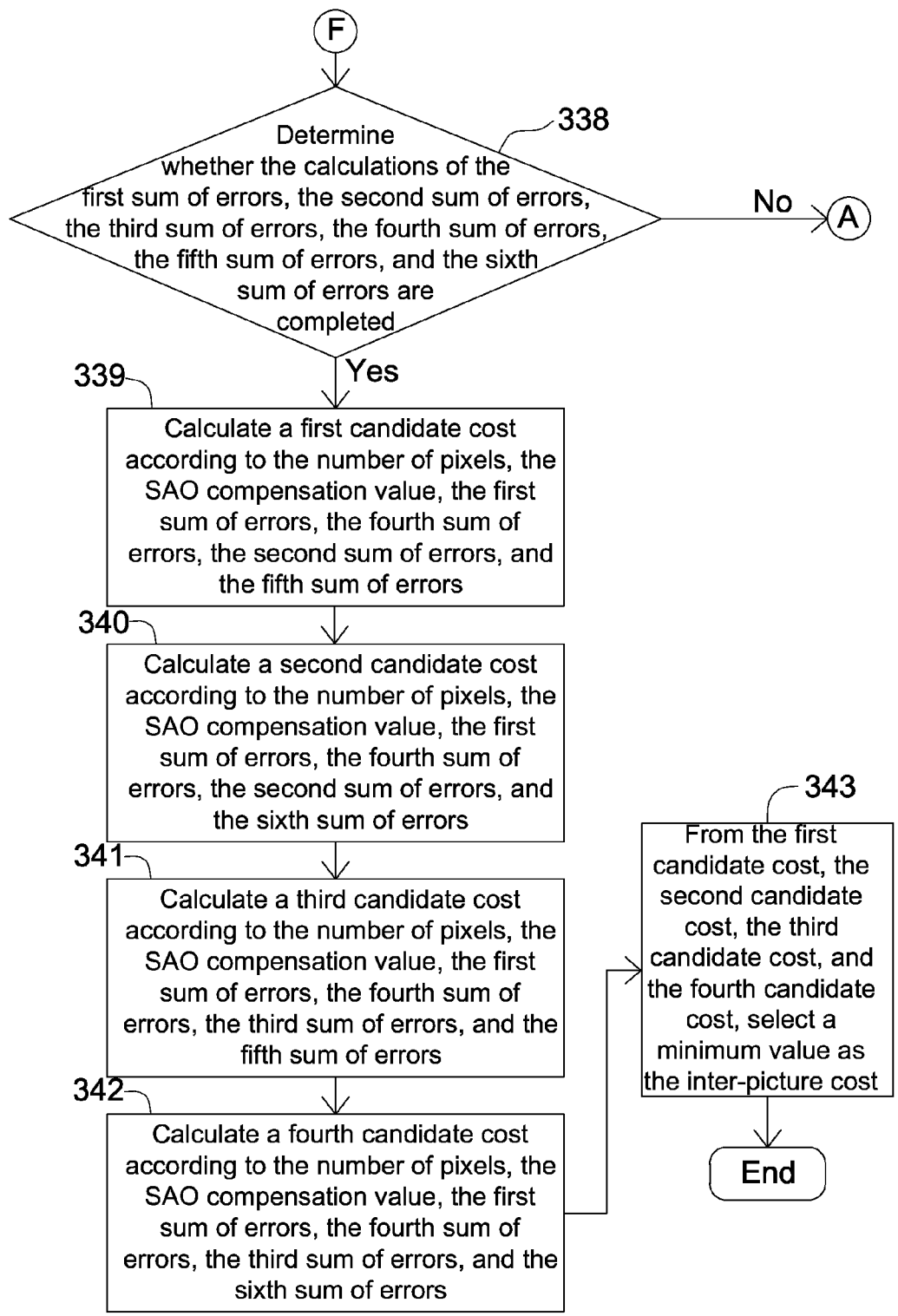

Referred to FIG. 8, FIG. 11, and FIG. 12. FIG. 11 is a detailed flowchart of step 23 according to first embodiment. FIG. 12 is a diagram showing differences after compensation. The step 23 further includes step 231 to step 234 in first embodiment. As shown in step 231, the inter-picture cost computation module 13 calculates a first sum of squared errors $D_{t,b}$ according to the original differences ΔS and the before-compensation differences ΔX. The first sum of squared errors $D_{t,b}$ is $\Sigma_k[|\Delta S_k|-|\Delta X_k|]^2 = \Sigma_k[|S_{k,t}-S_{k,t-1}|-|X_{k,t}-X_{k,t-1}^r|]^2$. As shown in FIG. 12, for example, the original differences ΔS are 1, 1, and 1, and the before-compensation differences ΔX are 8, 8, and 8. Therefore, the first sum of squared errors $D_{t,b}=(1-8)^2+(1-8)^2+(1-8)^2=147$.

As shown in step 232, the inter-picture cost computation module 13 calculates an after-compensation differences $\Delta X+a_c$ between the first compensated pixels at the first frame time t−1 and second compensated pixels at the second frame time t. As shown in FIG. 12, for example, the pixel values of the first compensated pixels at the first frame time t−1 are 6, 6, and 6. The pixel values of the second compensated pixels at the second frame time t are 7, 7, and 7. Therefore the after-compensation differences $\Delta X + a_c$ are 1, 1, and 1.

As shown in step 233, the inter-picture cost computation module 13 calculates second sum of squared errors $D_{t,a}$ according to the original differences $\Delta S$ and the after-compensation differences $\Delta X + a_c$. The second sum of squared errors $D_{t,a}$ is $\Sigma_k[|\Delta S_k|-|\Delta X_k+a_c|]^2 = \Sigma_k[|S_{k,t}-S_{k,t-1}|-|X_{k,t}+a_c-X_{k,t-1}'|]^2$. As shown in FIG. 12, for example, the second sum of squared errors $D_{t,a}=(1-1)^2+(1-1)^2+(1-1)^2=0$. As shown in step 234, the inter-picture cost computation module 13 subtracts the first sum of squared errors $D_{t,b}$ from the second sum of squared errors $D_{t,a}$ to generate an inter-picture cost D. The inter-picture cost $D=D_{t,a}-D_{t,b}$. As shown in FIG. 12, for example, the inter-picture cost $D=0-147=-147$.

In one embodiment, SAO compensation value $a_c$ is selected from compensation values −7, −6, −5, . . . , 0, . . . , 5, 6, and 7. SAO compensation value $a_c$ may be selected such that the inter-picture cost D is a minimum. The second compensated pixels at the second frame time t are generated by compensating the reconstructed pixels with SAO compensation value $a_c$. Furthermore, the minimum value of the inter-picture cost D may be obtained by performing the flow described above with each of the compensation values −7, −6, −5, . . . , 0, . . . , 5, 6, and 7. The compensated pixels calculated from the compensation value which is corresponding to the minimum of the inter-picture cost D can be the second compensated pixels at the frame time t.

Second Embodiment

Referred to FIG. 8, FIG. 13A, FIG. 13B, and FIG. 14, FIG. 13A, FIG. 13B, and FIG. 14 are detailed flowcharts of step 23 according to second embodiment. The main difference between the second embodiment and the first embodiment is that the detailed flows in step 23 are different. The step 23 in the second embodiment includes step 331 to step 343. For each of the original differences $\Delta S$ corresponding to each pixel and each of the before-compensation differences $\Delta X$ corresponding to each pixel, the original difference corresponding to the pixel at position k being represented by $\Delta S_k$, the before-compensation difference corresponding to the pixel at position k being represented by $\Delta X_k$, k being an integer, as shown in step 331, inter-picture cost computation module 13 determines whether the condition that the sign (i.e. positive or negative) of the original difference $\Delta S_k$ corresponding to the pixel at position k and the sign of the before-compensation difference $\Delta X_k$ corresponding to the pixel at position k are the same and the absolute value of the before-compensation difference $\Delta X_k$ is not smaller than a threshold value TH is met. The threshold value TH, for example, is smaller than 8. If the condition that the sign of the original difference $\Delta S_k$ and the sign of the before-compensation difference $\Delta X_k$ are the same and the absolute value of the before-compensation difference $\Delta X_k$ is not smaller than a threshold value TH is met, step 332 is performed. As shown in step 332, inter-picture cost computation module 13 calculates a first sum of errors $e_w$ according to a positive value of the original difference $\Delta S_k$ and the before-compensation difference $\Delta X_k$, wherein the first sum of errors $e_w$ targets the positive value of the original difference $\Delta S_k$. The first sum of errors $e_w$ is equal to $\Sigma(\Delta S_k - \Delta X_k)$. That is, the first sum of errors $e_w$ is equal to the sum of $\Delta S_k - \Delta X_k$ of the pixels at the positions where the condition that the sign of the original difference $\Delta S_k$ and the sign of the before-compensation difference $\Delta X_k$ are the same and the absolute value of the before-compensation difference $\Delta X_k$ is not smaller than a threshold value TH is met.

If the condition that the sign of the original difference $\Delta S_k$ and the sign of the before-compensation difference $\Delta X_k$ are the same and the absolute value of the before-compensation difference $\Delta X_k$ is not smaller than a threshold value TH is not met, step 333 is performed. As shown in step 333, the inter-picture cost computation module 13 determines whether the condition that the sign of the original difference $\Delta S_k$ and the sign of the before-compensation difference $\Delta X_k$ are the same and the absolute value of the before-compensation difference $\Delta X_k$ is smaller than the threshold value TH is met. If the condition that the sign of the original difference $\Delta S_k$ and the sign of the before-compensation difference $\Delta X_k$ are the same and the absolute value of the before-compensation difference $\Delta X_k$ is smaller than the threshold value TH is met, step 334 is performed. As shown in step 334, the inter-picture cost computation module 13 calculates a second sum of errors $e_{y+}$ according to the positive value of the original difference $\Delta S_k$ and the before-compensation difference $\Delta X_k$, wherein the second sum of errors $e_{y+}$ targets the positive value of the original difference $\Delta S_k$. The inter-picture cost computation module 13 also calculates a third sum of errors $e_{y-}$ according to a negative value of the original difference $\Delta S_k$ and the before-compensation difference $\Delta X_k$, wherein the third sum of errors $e_{y-}$ targets the negative value of the original difference $\Delta S_k$. The second sum of errors $e_{y+}$ is equal to $\Sigma(\Delta S_k - \Delta X_k)$. The third sum of errors $e_{y-}$ is equal to $\Sigma(\Delta S_k - \Delta X_k)$. That is, the second sum of errors $e_{y+}$ is equal to the sum of $\Delta S_k - \Delta X_k$ of the pixels at the positions where the condition that the sign of the original difference $\Delta S_k$ and the sign of the before-compensation difference $\Delta X_k$ are the same and the absolute value of the before-compensation difference $\Delta X_k$ is smaller than the threshold value TH is met. The third sum of errors $e_{y-}$ is equal to the sum of $\Delta S_k - \Delta X_k$ of the pixels at the positions where the condition that the sign of the original difference $\Delta S_k$ and the sign of the before-compensation difference $\Delta X_k$ are the same and the absolute value of the before-compensation difference $\Delta X_k$ is smaller than the threshold value TH is met.

If the condition that the sign of the original difference $\Delta S_k$ and the sign of the before-compensation difference $\Delta X_k$ are the same and the absolute value of the before-compensation difference $\Delta X_k$ is smaller than the threshold value TH is not met, step 335 is performed. As shown in step 335, the inter-picture cost computation module 13 determines whether the condition that the sign of the original difference $\Delta S_k$ and the sign of the before-compensation difference $\Delta X_k$ are different and the absolute value of the before-compensation difference $\Delta X_k$ is not smaller than the threshold value TH is met. If the condition that the sign of the original difference $\Delta S_k$ and the sign of the before-compensation difference $\Delta X_k$ are different and the absolute value of the before-compensation difference $\Delta X_k$ is not smaller than the threshold value TH is met, step 336 is performed. As shown in step 336, inter-picture cost computation module 13 calculates a fourth sum of errors $e_x$ according to the negative value of the original difference $\Delta S_k$ and the before-compensation difference $\Delta X_k$, wherein the fourth sum of errors $e_x$ targets the negative value of the original difference $\Delta S_k$. The fourth sum of errors $e_x$ is equal to $\Sigma(\Delta S_k - \Delta X_k)$. That is, the fourth sum of errors $e_x$ is equal to the sum of $\Delta S_k - \Delta X_k$ of the pixels at the positions where the condition that the sign of the original difference $\Delta S_k$ and the sign of the before-compensation difference ac are different and the absolute value of the before-compensation difference $\Delta X_k$ is not smaller than the threshold value TH is met.

If the condition that the sign of the original difference $\Delta S_k$ and the sign of the before-compensation difference $\Delta X_k$ are different and the absolute value of the before-compensation difference $\Delta X_k$ is not smaller than the threshold value TH is not met, step 337 is performed. As shown in step 337, the inter-picture cost computation module 13 calculates a fifth sum of errors $e_{z+}$ according to the positive value of the original difference $\Delta S_k$ and the before-compensation difference $\Delta X_k$, wherein the fifth sum of errors $e_{z+}$ targets the positive value of the original difference $\Delta S_k$. The inter-picture cost computation module 13 also calculates a sixth sum of errors $e_{z-}$ according to the negative value of the original difference $\Delta S_k$ and the before-compensation difference $\Delta X_k$, wherein the sixth sum of errors $e_{z-}$ targets the negative value of the original difference $\Delta S_k$. The fifth sum of errors $e_{z+}$ is equal to $\Sigma(\Delta S_k-\Delta X_k)$. The sixth sum of errors $e_{z-}$ is equal to $\Sigma(\Delta S_k-\Delta X_k)$. That is, the fifth sum of errors $e_{z+}$ is equal to the sum of $\Delta S_k-\Delta X_k$ of the pixels at the positions where the condition that the sign of the original difference $\Delta S_k$ and the sign of the before-compensation difference $\Delta X_k$ are different and the absolute value of the before-compensation difference $\Delta X_k$ is not smaller than the threshold value TH is not met. And, the sixth sum of errors $e_{z-}$ is equal to the sum of $-\Delta S_k-\Delta X_k$ of the pixels at the positions where the condition that the sign of the original difference $\Delta S_k$ and the sign of the before-compensation difference $\Delta X_k$ are different and the absolute value of the before-compensation difference $\Delta X_k$ is not smaller than the threshold value TH is not met.

When the step 332, step 334, step 336, or step 337 is performed completely, step 338 is performed. As shown in step 338, the inter-picture cost computation module 13 determines whether the calculations of the first sum of errors $e_w$, the second sum of errors $e_{y+}$, the third sum of errors $e_{y-}$, the fourth sum of errors $e_x$, the fifth sum of errors $e_{z+}$, and the sixth sum of errors $e_{z-}$ are completed. When the calculations of the first sum of errors $e_w$, the second sum of errors $e_{y+}$, the third sum of errors $e_{z-}$, the fourth sum of errors $e_x$, the fifth sum of errors $e_{z+}$, and the sixth sum of errors $e_{z-}$ are completed, step 339 is performed subsequently.

As shown in step 339, the inter-picture cost computation module calculates a first candidate cost $D_{t,1}$ according to the number of pixels $N_c$, the SAO compensation value $a_c$, the first sum of errors $e_w$, the fourth sum of errors $e_x$, the second sum of errors $e_{y+}$, and the fifth sum of errors $e_{z+}$. The first candidate cost $D_{t,1}=N_c a_c^2-2a_c(e_w+e_x+e_{y+}+e_{z-})$. As shown in step 340, the inter-picture cost computation module 13 calculates a second candidate cost $D_{t,2}$ according to the number of pixels $N_c$, the SAO compensation value $a_c$, the first sum of errors $e_w$, the fourth sum of errors $e_x$, the second sum of errors $e_{y+}$, and the sixth sum of errors $e_{z-}$. The second candidate cost $D_{t,2}=N_c a_c^2-2a_c(e_w+e_x+e_{y+}+e_{z-})$.

As shown in step 341, the inter-picture cost computation module 13 calculates a third candidate cost $D_{t,3}$ according to the number of pixels $N_c$, the SAO compensation value $a_c$, the first sum of errors $e_w$, the fourth sum of errors $e_x$, the third sum of errors $e_{y-}$, and the fifth sum of errors $e_{z+}$. The third candidate cost $D_{t,3}=N_c a_c^2-2a_c(e_w+e_x+e_{y-}+e_{z+})$. As shown in step 342, the inter-picture cost computation module 13 calculates a fourth candidate cost $D_{t,4}$ according to the number of pixels $N_c$, the SAO compensation value $a_c$, the first sum of errors $e_w$, the fourth sum of errors $e_x$, the third sum of errors $e_{y-}$, and the sixth sum of errors $e_{z-}$. The fourth candidate cost $D_{t,4}=N_c a_c^2-2a_c(e_w+e_x+e_{y-}+e_{z-})$. As shown in step 343, from the first candidate cost $D_{t,1}$, the second candidate cost $D_{t,2}$, the third candidate cost $D_{t,3}$, and the fourth candidate cost $D_{t,4}$, the inter-picture cost computation module 13 selects a minimum value as the inter-picture cost.

In another embodiment, in stead of the inter-picture cost, compensation module 14 compensates the reconstructed pixels according to the SAO compensation value when a rate-distortion (RD) is a minimum. The RD includes a distortion component and a bit-rate component. In one embodiment, the RD is the summation of the distortion component and the bit-rate component. The distortion component is the inter-picture cost mentioned above. The bit-rate component is number of bits per second can be transmitted. The SAO compensation value may be encoded into one or more bits. For example, the SAO compensation value which is 0 may be encoded into 1 bit while the SAO compensation value which is 1 may be encoded into 2 bits. The smaller the bit-rate, the higher the compression rate. By compensating the reconstructed pixels according to the SAO compensation value when the rate-distortion (RD) is a minimum, the distortion of the reconstructed picture may be small and the compression rate may be high.

According to embodiments of inter-picture cost computation method and embodiments of inter-picture cost computation apparatus described above, since inter-picture cost are calculated with consideration of characteristics at different frame time, the flicker phenomenon may be reduced, and the quality of sequentially displaying pictures are improved.

The embodiments disclosed above are not to limit the invention. It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. An inter-picture cost computation method, comprising:
    calculating original differences between a plurality of first original pixels at a first frame time and a plurality of second original pixels at a second frame time;
    calculating before-compensation differences between a plurality of first compensated pixels at the first frame time and a plurality of reconstructed pixels at the second frame time;
    calculating an inter-picture cost according to an SAO (Sample Adaptive Offset) compensation value, the original differences, and the before-compensation differences; and
    compensating the plurality of reconstructed pixels according to the SAO compensation value when the inter-picture cost is a minimum.

2. The inter-picture cost computation method according to claim 1, wherein the step of calculating the inter-picture cost comprises:
    calculating a first sum of squared errors according to the original differences and the before-compensation differences.

3. The inter-picture cost computation method according to claim 2, wherein the step of calculating the inter-picture cost further comprises:
    calculating after-compensation differences between the plurality of first compensated pixels at the first frame time and a plurality of second compensated pixels at the second frame time; and calculating a second sum of squared errors according to the original differences and the after-compensation differences.

4. The inter-picture cost computation method according to claim 3, wherein the step of calculating the inter-picture cost further comprises:
subtracting the first sum of squared errors from the second sum of squared errors to generate the inter-picture cost.

5. The inter-picture cost computation method according to claim 1, wherein the step of calculating the inter-picture cost comprises:
for each of the original differences corresponding to each pixel and each of the before-compensation differences corresponding to each pixel, the original difference corresponding to the pixel at position k being represented by $\Delta S_k$, the before-compensation difference corresponding to the pixel at position k being represented by $\Delta X_k$, k being an integer, determining whether a condition that a sign of the original difference $\Delta S_k$ corresponding to the pixel at position k and a sign of the before-compensation difference $\Delta X_k$ corresponding to the pixel at position k are the same and an absolute value of the before-compensation difference $\Delta X_k$ is not smaller than a threshold value is met; and
calculating a first sum of errors according to a positive value of the original difference $\Delta S_k$ and the before-compensation difference $\Delta X_k$ if the condition that the sign of the original difference $\Delta S_k$ and the sign of the before-compensation difference $\Delta X_k$ are the same and the absolute value of the before-compensation difference $\Delta X_k$ is not smaller than the threshold value is met, wherein the first sum of errors targets the positive value of the original difference, and the first sum of errors is equal to $\Sigma(\Delta S_k - \Delta X_k)$.

6. The inter-picture cost computation method according to claim 5, wherein the step of calculating the inter-picture cost further comprises:
if the condition that the sign of the original difference $\Delta S_k$ and the sign of the before-compensation difference $\Delta X_k$ are the same and the absolute value of the before-compensation difference $\Delta X_k$ is not smaller than the threshold value is not met, determining whether the condition that the sign of the original difference $\Delta S_k$ and the sign of the before-compensation difference $\Delta X_k$ are the same and the absolute value of the before-compensation difference $\Delta X_k$ is smaller than the threshold value is met; and
if the condition that the sign of the original difference $\Delta S_k$ and the sign of the before-compensation difference $\Delta X_k$ are the same and the absolute value of the before-compensation difference $\Delta X_k$ is smaller than the threshold value is met, calculating a second sum of errors according to the positive value of the original difference $\Delta S_k$ and the before-compensation difference $\Delta X_k$, and calculating a third sum of errors according to a negative value of the original difference $\Delta S_k$ and the before-compensation difference $\Delta X_k$, wherein the second sum of errors targets the positive value of the original difference $\Delta S_k$, the third sum of errors targets the negative value of the original difference $\Delta S_k$, the second sum of errors is equal to $\Sigma(\Delta S_k - \Delta X_k)$, and the third sum of errors is equal to $\Sigma(-\Delta S_k - \Delta X_k)$.

7. The inter-picture cost computation method according to claim 6, wherein the step of calculating the inter-picture cost further comprises:
if the condition that the sign of the original difference $\Delta S_k$ and the sign of the before-compensation difference $\Delta X_k$ are the same and the absolute value of the before-compensation difference $\Delta X_k$ is smaller than the threshold value is not met, determining whether a condition that the sign of the original difference $\Delta S_k$ and the sign of the before-compensation difference $\Delta X_k$ are different and the absolute value of the before-compensation difference $\Delta X_k$ is not smaller than the threshold value is met; and
if the condition that the sign of the original difference $\Delta S_k$ and the sign of the before-compensation difference $\Delta X_k$ are different and the absolute value of the before-compensation difference $\Delta X_k$ is not smaller than the threshold value is met, calculating a fourth sum of errors according to the negative value of the original difference $\Delta S_k$ and the before-compensation difference $\Delta X_k$, wherein the fourth sum of errors targets the negative value of the original difference $\Delta S_k$, the fourth sum of errors is equal to $\Sigma(-\Delta S_k - \Delta X_k)$.

8. The inter-picture cost computation method according to claim 7, wherein the step of calculating the inter-picture cost further comprises:
if the condition that the sign of the original difference $\Delta S_k$ and the sign of the before-compensation difference $\Delta X_k$ are different and the absolute value of the before-compensation difference $\Delta X_k$ is not smaller than the threshold value is not met, calculating a fifth sum of errors according to the positive value of the original difference $\Delta S_k$ and the before-compensation difference $\Delta X_k$, and calculating a sixth sum of errors according to the negative value of the original difference $\Delta S_k$ and the before-compensation difference $\Delta X_k$, wherein the fifth sum of errors targets the positive value of the original difference $\Delta S_k$, the sixth sum of errors targets the negative value of the original difference $\Delta S_k$, the fifth sum of errors is equal to $\Sigma(\Delta S_k - \Delta X_k)$, and the sixth sum of errors is equal to $\Sigma(-\Delta S_k - \Delta X_k)$.

9. The inter-picture cost computation method according to claim 8, wherein the step of calculating the inter-picture cost further comprises:
calculating a first candidate cost according to a number of pixels, the SAO compensation value, the first sum of errors, the fourth sum of errors, the second sum of errors, and the fifth sum of errors;
calculating a second candidate cost according to the number of pixels, the SAO compensation value, the first sum of errors, the fourth sum of errors, the second sum of errors, and the sixth sum of errors;
calculating a third candidate cost according to the number of pixels, the SAO compensation value, the first sum of errors, the fourth sum of errors, the third sum of errors, and the fifth sum of errors;
calculating a fourth candidate cost according to the number of pixels, the SAO compensation value, the first sum of errors, the fourth sum of errors, the third sum of errors, and the sixth sum of errors; and
from the first candidate cost, the second candidate cost, the third candidate cost, and the fourth candidate cost, selecting a minimum value as the inter-picture cost.

10. The inter-picture cost computation method according to claim 1, wherein the SAO compensation value is selected from a plurality of compensation values such that the inter-picture cost is a minimum, and a plurality of second compensated pixels at the second frame time are generated by compensating the plurality of reconstructed pixels with the SAO compensation value.

11. An inter-picture cost computation apparatus, comprising:

an original difference calculation module, for calculating original differences between a plurality of first original pixels at a first frame time and a plurality of second original pixels at a second frame time;
a before-compensation difference calculation module, for calculating a before-compensation differences between a plurality of first compensated pixels at the first frame time and a plurality of reconstructed pixels at the second frame time;
an inter-picture cost computation module, for calculating an inter-picture cost according to an SAO (Sample Adaptive Offset) compensation value, the original differences, and the before-compensation differences; and
a compensation module, for compensating the plurality of reconstructed pixels according to the SAO compensation value when the inter-picture cost is a minimum.

12. The inter-picture cost computation apparatus according to claim 11, wherein the inter-picture cost computation module further calculates a first sum of squared errors according to the original differences and the before-compensation differences.

13. The inter-picture cost computation apparatus according to claim 12, wherein the inter-picture cost computation module further calculates a after-compensation differences between the plurality of first compensated pixels at the first frame time and a plurality of second compensated pixels at the second frame time, and calculates a second sum of squared errors according to the original differences and the after-compensation differences.

14. The inter-picture cost computation apparatus according to claim 13, wherein the inter-picture cost computation module further subtracts the first sum of squared errors from the second sum of squared errors to generate the inter-picture cost.

15. The inter-picture cost computation apparatus according to claim 11, wherein the inter-picture cost computation module further, for each of the original differences corresponding to each pixel and each of the before-compensation differences corresponding to each pixel, the original difference corresponding to the pixel at position k being represented by $\Delta S_k$, the before-compensation difference corresponding to the pixel at position k being represented by $\Delta X_k$, k being an integer, determines whether a condition that a sign of the original difference $\Delta S_k$ corresponding to the pixel at position k and a sign of the before-compensation difference $\Delta X_k$ corresponding to the pixel at position k are the same and an absolute value of the before-compensation difference $\Delta X_k$ is not smaller than a threshold value is met, if the condition that the sign of the original difference $\Delta S_k$ and the sign of the before-compensation difference $\Delta X_k$ are the same and the absolute value of the before-compensation difference $\Delta X_k$ is not smaller than the threshold value is met, the inter-picture cost computation module calculates a first sum of errors according to a positive value of the original difference $\Delta S_k$ and the before-compensation difference $\Delta X_k$, wherein the first sum of errors targets the positive value of the original difference $\Delta S_k$, and the first sum of errors is equal to $\Sigma(\Delta S_k - \Delta X_k)$.

16. The inter-picture cost computation apparatus according to claim 15, wherein if the condition that the sign of the original difference $\Delta S_k$ and the sign of the before-compensation difference $\Delta X_k$ are the same and the absolute value of the before-compensation difference $\Delta X_k$ is not smaller than the threshold value is not met, the inter-picture cost computation module determines whether the condition that the sign of the original difference $\Delta S_k$ and the sign of the before-compensation difference $\Delta X_k$ are the same and the absolute value of the before-compensation difference $\Delta X_k$ is smaller than the threshold value is met, if the condition that the sign of the original difference $\Delta S_k$ and the sign of the before-compensation difference $\Delta X_k$ are the same and the absolute value of the before-compensation difference $\Delta X_k$ is smaller than the threshold value is met, the inter-picture cost computation module calculates a second sum of errors according to the positive value of the original difference $\Delta S_k$ and the before-compensation difference $\Delta X_k$, and calculates a third sum of errors according to a negative value of the original difference $\Delta S_k$ and the before-compensation difference $\Delta X_k$, wherein the second sum of errors targets the positive value of the original difference $\Delta S_k$, the third sum of errors targets the negative value of the original difference $\Delta S_k$, the second sum of errors is equal to $\Sigma(\Delta S_k - \Delta X_k)$, and the third sum of errors is equal to $\Sigma(-\Delta S_k - \Delta X_k)$.

17. The inter-picture cost computation apparatus according to claim 16, wherein if the condition that the sign of the original difference $\Delta S_k$ and the sign of the before-compensation difference $\Delta X_k$ are the same and the absolute value of the before-compensation difference $\Delta X_k$ is smaller than the threshold value is not met, the inter-picture cost computation module determines whether a condition that the sign of the original difference $\Delta S_k$ and the sign of the before-compensation difference $\Delta X_k$ are different and the absolute value of the before-compensation difference $\Delta X_k$ is not smaller than the threshold value is met, if the condition that the sign of the original difference $\Delta S_k$ and the sign of the before-compensation difference $\Delta X_k$ are different and the absolute value of the before-compensation difference $\Delta X_k$ is not smaller than the threshold value is met, the inter-picture cost computation module calculating a fourth sum of errors according to the negative value of the original difference $\Delta S_k$ and the before-compensation difference $\Delta X_k$, wherein the fourth sum of errors targets the negative value of the original difference $\Delta S_k$, the fourth sum of errors is equal to $\Sigma(-\Delta S_k - \Delta X_k)$.

18. The inter-picture cost computation apparatus according to claim 17, wherein if the condition that the sign of the original difference $\Delta S_k$ and the sign of the before-compensation difference $\Delta X_k$ are different and the absolute value of the before-compensation difference $\Delta X_k$ is not smaller than the threshold value is not met, the inter-picture cost computation module calculates a fifth sum of errors according to the positive value of the original difference $\Delta S_k$ and the before-compensation difference $\Delta X_k$, and calculates a sixth sum of errors according to the negative value of the original difference $\Delta S_k$ and the before-compensation difference $\Delta X_k$, wherein the fifth sum of errors targets the positive value of the original difference $\Delta S_k$, and the sixth sum of errors targets the negative value of the original difference $\Delta S_k$, the fifth sum of errors is equal to $\Sigma(\Delta S_k - \Delta X_k)$, and the sixth sum of errors is equal to $\Sigma(-\Delta S_k - \Delta X_k)$.

19. The inter-picture cost computation apparatus according to claim 18, wherein the inter-picture cost computation module further calculates a first candidate cost according to a number of pixels, the SAO compensation value, the first sum of errors, the fourth sum of errors, the second sum of errors, and the fifth sum of errors, and calculates a second candidate cost according to the number of pixels, the SAO compensation value, the first sum of errors, the fourth sum of errors, the second sum of errors, and the sixth sum of errors, the inter-picture cost computation module calculates a third candidate cost according to the number of pixels, the SAO compensation value, the first sum of errors, the fourth sum of errors, the third sum of errors, and the fifth sum of errors, and calculates a fourth candidate cost according to the number of pixels, the SAO compensation value, the first sum of errors, the fourth sum of errors, the third sum of errors, and the sixth sum of errors, and the inter-picture cost computation module selects a minimum value as the inter-picture cost from the first candidate cost, the second candidate cost, the third candidate cost, and the fourth candidate cost.

20. The inter-picture cost computation apparatus according to claim 11, wherein the SAO compensation value is selected from a plurality of compensation values such that the inter-picture cost is a minimum, and a plurality of second compensated pixels at the second frame time are generated by compensating the plurality of reconstructed pixels with the SAO compensation value.

21. An inter-picture cost computation method, comprising:
   calculating original differences between a plurality of first original pixels at a first frame time and a plurality of second original pixels at a second frame time;
   calculating before-compensation differences between a plurality of first compensated pixels at the first frame time and a plurality of reconstructed pixels at the second frame time;
   calculating an inter-picture cost according to an SAO (Sample Adaptive Offset) compensation value, the original differences, and the before-compensation differences; and
   compensating the plurality of reconstructed pixels according to the SAO compensation value when a rate-distortion is a minimum, wherein the rate-distortion is generated based on the inter-picture cost and a bit-rate component.

\* \* \* \* \*